United States Patent
Oba

(10) Patent No.: US 10,284,751 B2
(45) Date of Patent: May 7, 2019

(54) OPTICAL SCANNING HEAD-MOUNTED DISPLAY AND RETINAL SCANNING HEAD-MOUNTED DISPLAY

(71) Applicant: Kimiyuki Oba, Tokyo (JP)

(72) Inventor: Kimiyuki Oba, Tokyo (JP)

(73) Assignee: MITSUMI ELECTRIC CO., LTD., Tokyo (JP)

(*) Notice: Subject to any disclaimer, the term of this patent is extended or adjusted under 35 U.S.C. 154(b) by 125 days.

(21) Appl. No.: 15/690,445

(22) Filed: Aug. 30, 2017

(65) Prior Publication Data

US 2018/0091702 A1    Mar. 29, 2018

(30) Foreign Application Priority Data

Sep. 28, 2016   (JP) ................. 2016-188953

(51) Int. Cl.
*H04N 3/08*     (2006.01)
*H04N 9/31*     (2006.01)
(Continued)

(52) U.S. Cl.
CPC ............. *H04N 3/08* (2013.01); *G02B 27/017* (2013.01); *H04N 5/21* (2013.01); *H04N 9/3135* (2013.01);
(Continued)

(58) Field of Classification Search
None
See application file for complete search history.

(56) References Cited

U.S. PATENT DOCUMENTS 6,449,309 B1 * 9/2002 Tabata ............... G02B 27/2264
                                                              348/53
2008/0088937 A1 * 4/2008 Tang .................. G02B 27/0172
                                                              359/630
(Continued)

FOREIGN PATENT DOCUMENTS

EP    1806571    7/2007
EP    2239614    10/2010
(Continued)

OTHER PUBLICATIONS

Extended European search report for European Patent Application No. 17190915.3 dated Apr. 9, 2018.

*Primary Examiner* — Duane N Taylor, Jr.
(74) *Attorney, Agent, or Firm* — IPUSA, PLLC

(57) ABSTRACT

An optical scanning head-mounted display includes an optical scanning controller that emits, as image light, a laser beam in accordance with an image signal; a transmission cable that transmits the image light emitted from the optical scanning controller; and a head mount unit provided with an optical scanner including a mirror for scanning the image light transmitted by the transmission cable, wherein the head mount unit includes an amplifier that amplifies a motion signal corresponding to a tilt of the mirror, the motion signal being output from the optical scanner, and wherein the optical scanning controller includes a difference generator that generates a difference signal from the motion signal output from the amplifier through the transmission cable and a filter that removes noise from the difference signal generated by the difference generator.

6 Claims, 3 Drawing Sheets

(51) Int. Cl.
*H04N 5/21* (2006.01)
*G02B 27/01* (2006.01)
*H04N 7/10* (2006.01)

(52) U.S. Cl.
CPC ......... *H04N 9/3161* (2013.01); *H04N 9/3194* (2013.01); *G02B 2027/015* (2013.01); *G02B 2027/0152* (2013.01); *H04N 7/102* (2013.01)

(56) References Cited

U.S. PATENT DOCUMENTS

| | | |
|---|---|---|
| 2010/0079865 A1 | 4/2010 | Saarikko et al. |
| 2010/0149073 A1* | 6/2010 | Chaum ............... G02B 27/0093 345/8 |
| 2012/0188149 A1 | 7/2012 | Yamada |
| 2016/0116748 A1 | 4/2016 | Carollo et al. |

FOREIGN PATENT DOCUMENTS

| | | |
|---|---|---|
| EP | 2793471 | 10/2014 |
| JP | 2012-053323 | 3/2012 |

\* cited by examiner

OPTICAL SCANNING HEAD-MOUNTED DISPLAY AND RETINAL SCANNING HEAD-MOUNTED DISPLAY

BACKGROUND OF THE INVENTION

1. Field of the Invention

The present disclosure relates to an optical scanning head-mounted display and a retinal scanning head-mounted display.

2. Description of the Related Art

An optical scanning head-mounted display has been known that includes an optical scanning controller for forming image light, a transmission cable for transmitting the image light emitted from the optical scanning controller, and a head mount unit for scanning the image light transmitted by the transmission cable to project an image. As an example of the optical scanning head-mounted display with the above-described configuration, a retinal scanning head-mounted display has been known that scans image light to project an image on a retina of a user (cf. Patent Document 1).

RELATED-ART DOCUMENTS

Patent Documents

[Patent Document 1] Japanese Unexamined Patent Publication No. 2012-53323

SUMMARY OF THE INVENTION

Each of the above-described optical scanning head-mounted display and retinal scanning head-mounted display is configured such that the head mount unit and the optical scanning controller are coupled through the transmission cable. The head mount unit is a component that is to be attached to a head of a user.

Accordingly, wearability and usability of the head mount unit depend, not only on the size of the head mount unit, but also on the thickness, weight, etc., of the transmission cable.

However, for the optical scanning head-mounted display and the retinal scanning head-mounted display, enhancement of wearability and usability of the head mount unit is not considered in many cases.

There is a need for an optical scanning head-mounted display and a retinal scanning head-mounted display in which wearability and usability of a head mount unit are enhanced.

According to an aspect of the present disclosure, there is provided an optical scanning head-mounted display including an optical scanning controller that emits, as image light, a laser beam in accordance with an image signal; a transmission cable that transmits the image light emitted from the optical scanning controller; and a head mount unit provided with an optical scanner including a mirror for scanning the image light transmitted by the transmission cable, wherein the head mount unit includes an amplifier that amplifies a motion signal corresponding to a tilt of the mirror, the motion signal being output from the optical scanner, and wherein the optical scanning controller includes a difference generator that generates a difference signal from the motion signal output from the amplifier through the transmission cable and a filter that removes noise from the difference signal generated by the difference generator.

According to another aspect of the present disclosure, there is provided a retinal scanning head-mounted display including an optical scanning controller that emits, as image light, a laser beam in accordance with an image signal; a transmission cable that transmits the image light emitted from the optical scanning controller; and a head mount unit provided with an optical scanner including a mirror for scanning the image light transmitted by the transmission cable so as to project the image light onto a retina of a user, wherein the head mount unit includes an amplifier that amplifies a motion signal corresponding to a tilt of the mirror, the motion signal being output from the optical scanner, and wherein the optical scanning controller includes a difference generator that generates a difference signal from the motion signal output from the amplifier through the transmission cable and a filter that removes noise from the difference signal generated by the difference generator.

According to the disclosed technology, an optical scanning head-mounted display and a retinal scanning head-mounted display can be provided in which wearability and usability of a head mount unit are enhanced.

DESCRIPTION OF THE PREFERRED EMBODIMENTS

Figure 1:
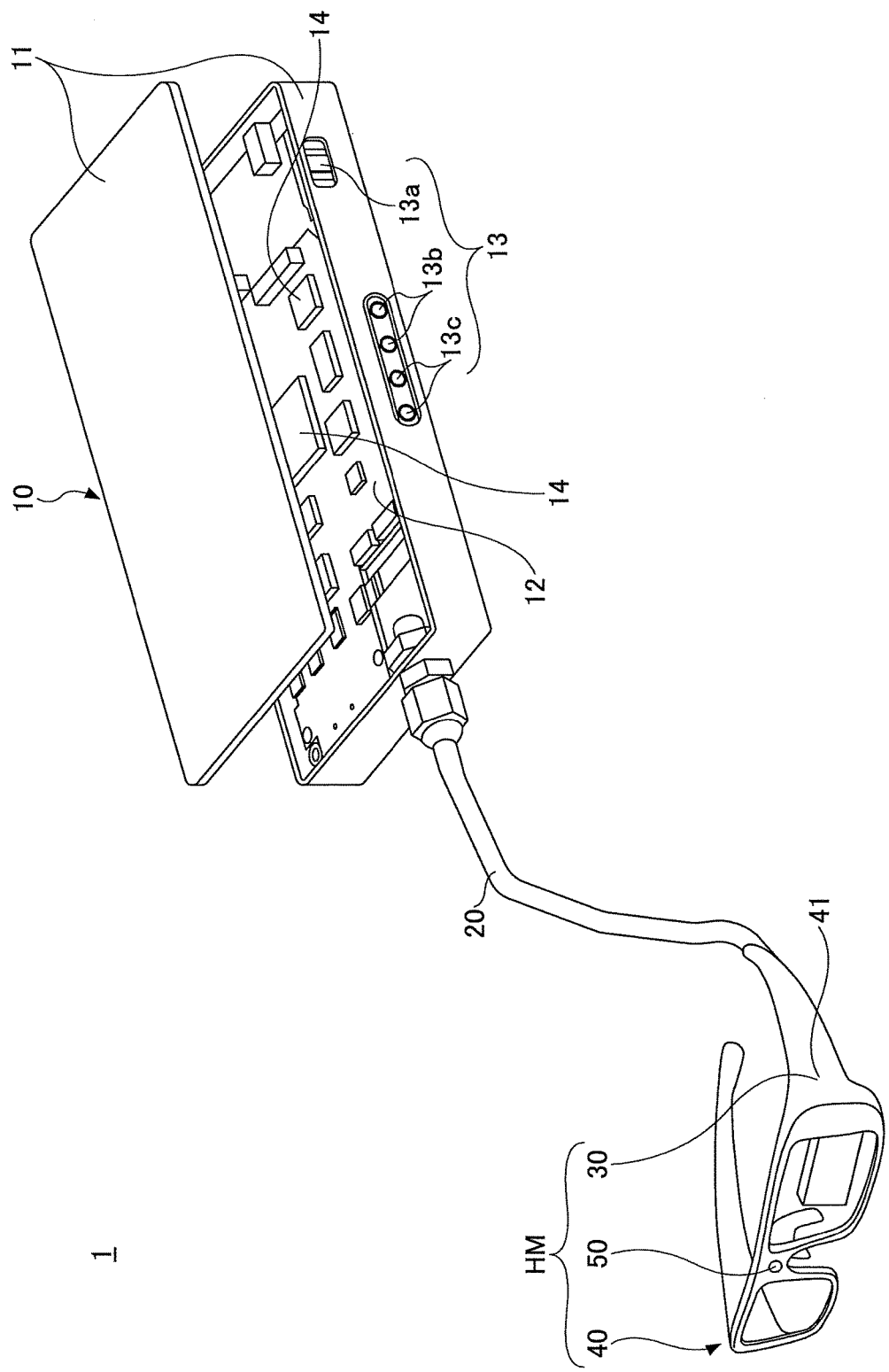
FIG. 1 is a diagram illustrating a schematic configuration of a retinal scanning head-mounted display according to an embodiment.

In the following, an optical scanning projector 1 (optical scanning head-mounted display) according to an embodiment is described by referring to FIG. 1. FIG. 1 is a diagram illustrating a schematic configuration of the optical scanning projector 1 according to the embodiment.

The optical scanning projector 1 according to the depicted example is a retinal scanning projector (retinal scanning head-mounted display) that utilizes a Maxwellian view. A Maxwellian view is a method of causing a user to visually recognize an image represented by image data without being affected by a function of a crystalline lens of the user by projecting, onto a retina, image light based on the image data (which may also be referred to as an image light beam, hereinafter) after the image light is converged once at a center of a pupil. Accordingly, in the following, the optical scanning projector 1 according to the embodiment is described by exemplifying the retinal scanning projector 1. Additionally, the optical scanning projector 1 (optical scanning head-mounted display) is denoted as the retinal scanning projector 1 (retinal scanning head-mounted display).

An overall configuration of the retinal scanning projector 1 is described. As illustrated in FIG. 1, the retinal scanning projector 1 is provided with an optical scanning controller 10; a transmission cable 20; and a head mount unit HM.

The optical scanning controller 10 has a size such that the optical scanning controller 10 is capable of being carried by being accommodated in a pocket, etc., of user's clothes. The optical scanning controller 10 emits, as image light, a laser beam with intensity according to an image signal. Details of the optical scanning controller 10 are described below.

The transmission cable 20 transmits the image light emitted from the optical scanning controller 10 to an optical scanner 30.

The head mount unit HM includes the optical scanner 30; an eyeglass frame 40; and an image capturing unit 50.

The optical scanner 30 projects an image indicated by image light onto a retina of a user by scanning the image light transmitted by the transmission cable 20 to irradiate the image light onto an eyeball (retina) of the user.

The eyeglass frame 40 is configured so that it can be attached to a head of a user. The image capturing unit 50 is provided with a camera, etc. The optical scanner 30 and the image capturing unit 50 are included in the eyeglass frame 40.

Here, the image light is light generated based on information that can be a source of an image to be projected onto a user's retina by the optical scanner 30. The information that can be the source of the image may be a symbol, such as a character and a number, or may be an image.

The optical scanning controller 10 is provided with a case 11 that can be operated by a user; an electronic circuit board 12; and an operation unit 13. The operation unit 13 is provided on a side surface of the case 11. The operation unit 13 is provided with, for example, a power supply switch 13a; a phase switch 13b; an adjuster 13c for adjusting a size of an image. The electronic circuit board 12 is accommodated inside the case 11. A plurality of IC chips 14 for implementing the operation of the optical scanning controller 10 is mounted on the electronic circuit board 12.

Figure 2:
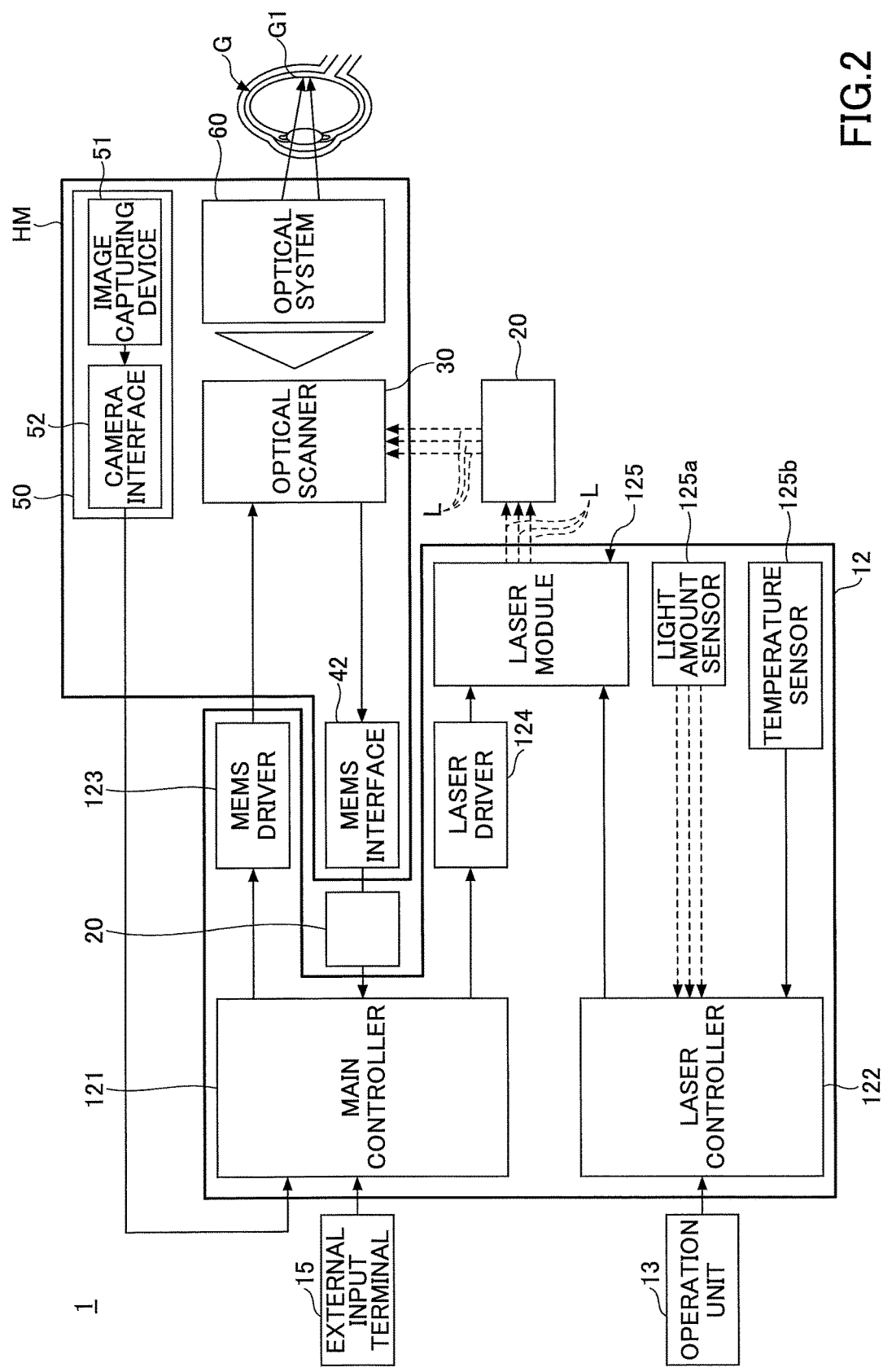
FIG. 2 is a diagram illustrating the retinal scanning head-mounted display according to the embodiment.

The optical scanning controller 10 is provided with an external input terminal 15 (cf. FIG. 2). The optical scanning controller 10 receives content information, etc., transmitted from an external device, such as a personal computer, which is not depicted, through the external input terminal 15. Note that the content information is information to be projected onto a retina of a user, such as a character, an image, and video. Specifically, the content information is, for example, a text file, an image file, a video file, etc., which are used for a personal computer.

The optical scanning controller 10 according to the embodiment is configured so that image signals can be input from two systems. The image signal from one of the two systems is an image signal input from the image capturing unit 50, and the image signal from the other one of the two systems is an image signal input from an external device.

From the above-described point, the operation unit 13 according to the embodiment is provided with a selection switch (not depicted) for allowing a user to select whether to project the image signal from the image capturing unit 50 onto a retina or to project the image signal from the external device onto the retina.

FIG. 2 is a diagram illustrating the retinal scanning projector 1 according to the embodiment. In FIG. 2, a configuration of the head mount unit HM, and circuit blocks implemented on the electronic circuit board 12 are illustrated.

First, the head mount unit HM is described.

The head mount unit HM according to the embodiment is provided with the optical scanner 30; a Micro Electro Mechanical System (MEMS) interface 42; the image capturing unit 50; and an optical system 60.

The optical scanner 30 is, for example, a Micro Electro Mechanical System (MEMS) mirror. The optical scanner 30 is, for example, arranged at a temple 41 of the eyeglass frame 40. The optical scanner 30 scans image light emitted from a laser module 125, which is described below, in a horizontal direction and in a vertical direction based on a drive control signal. The drive control signal is output from an MEMS driver 123, which is described below.

Furthermore, as a method of projecting an image onto a retina G1 of an eye ball G by scanning the image light, a method (e.g., raster scan) can be implemented such that an image is displayed by scanning light at high speed from upper left to lower right in a region onto which the image is to be projected.

The image light emitted from the optical scanner 30 is converged by the optical system 60 to be projected onto the retina G1. Note that the optical system 60 may be arranged in a lens part of the eyeglass frame 40.

The MEMS interface 42 detects a motion (deflection angle) of the optical scanner 30 (MEMS mirror) and outputs motion information (motion signal) corresponding to the tilt of the optical scanner 30 to a main controller 121, which is described below. Note that the MEMS interface 42 according to the embodiment may be provided with a temperature sensor (not depicted), and the MEMS interface 42 may detect a temperature of the optical scanner 30 to output temperature information to the main controller 121. Note that the motion signal output from the MEMS interface 42, which corresponds to the tilt of the optical scanner 30, is transmitted to the main controller 121 through the transmission cable 20.

The image capturing unit 50 according to the embodiment includes an image capturing device 51 and a camera interface 52.

The image capturing device 51 is a camera including an image sensor, such as a complementary metal-oxide-semiconductor (CMOS) image sensor. The camera interface 52 outputs an image signal of the camera output from the image capturing device 51 to the main controller 121, which is described below.

Next, the circuit blocks of the electronic circuit board 12 of the optical scanning controller 10 are described.

In the electronic circuit board 12, the main controller 121; a laser controller 122; the MEMS driver 123; a laser driver 124; and the laser module (light source) 125 are implemented.

The main controller 121 is implemented by a processor, such as a central processing unit (CPU); a random access memory (RAM); a read-only memory (ROM), etc. Image signals from two systems, which are an image signal of the camera output from the image capturing unit 50 and content information (image signal) output from an external device through the external input terminal 15, are input to the main controller 121. The main controller 121 executes processing of the input image signal and drive control of the optical scanner 30 (MEMS mirror).

Furthermore, based on the motion information, the temperature information, etc., of the optical scanner 30 obtained from the MEMS interface 42, the main controller 121 controls driving of the optical scanner 30 (MEMS mirror) and emission of image light from the laser module 125.

The main controller 121 outputs, to the MEMS driver 123, a drive control signal for controlling driving of the optical scanner 30. The MEMS driver 123 outputs the received drive control signal to the optical scanner 30.

Furthermore, the main controller 121 outputs the input image signal to the laser driver 124. The laser driver 124 generates, based on the image signal, an emission control signal to control turning on and turning off the laser beam, and the laser driver 124 outputs the generated emission control signal to the laser module 125.

The laser controller 122 is implemented by a processor, such as a CPU; a RAM; a ROM, etc. Upon detecting that a signal from the operation unit 13 to turn on the power supply, a zoom-in signal, or a zoom-out signal is input, the laser controller 122 outputs a control signal corresponding to the input signal to the laser module 125. Note that, upon receiving, at the selection switch of the operation unit 13, a selection of one image signal of the image signals from the two systems, the laser controller 122 according to the embodiment outputs a control signal to the laser module 125 in accordance with the selection.

In response to receiving an indication from the main controller 121, the laser module 125 outputs (emits) a laser beam L with one or more wavelengths to the optical scanner 30. The laser beam L is the image light beam for projecting an image onto the retina G1 of the user's eye ball G. Note that the laser beam L emitted from the laser module 125 is transmitted to the optical scanner 30 through the transmission cable 20. In the depicted example, for convenience of the description, the transmission cable 20 exists at two places; however, the transmission cable 20 is actually a single transmission cable.

For example, the laser module 125 emits a read laser beam (wavelength: approximately from 610 nm to 660 nm), a green laser beam (wavelength: approximately from 515 nm to 540 nm), and a blue laser beam (wavelength: approximately from 440 nm to 480 nm). The laser module 125 according to the embodiment is implemented, for example, by a light source in which laser diode chips in RGB (read, green, and blue), respectively, a device for combining three colors, and a micro collimator lens are integrated.

Additionally, the laser module 125 is provided with a light amount sensor 125a and a temperature sensor 125b. The light amount sensor 125a detects a light amount of each laser diode of the laser module 125 and outputs the detected light amount information to the laser controller 122. The temperature sensor 125b detects a temperature of each laser diode of the laser module 125 and outputs the detected temperature information to the laser controller 122.

The laser controller 122 generates a signal for controlling the light amount of each laser diode of the laser module 125 based on the light amount information obtained from the light amount sensor 125a, and the laser controller 122 outputs the generated signal to the laser module 125. As a result, brightness of the image projected onto the retina G1 can be properly controlled.

Figure 3:
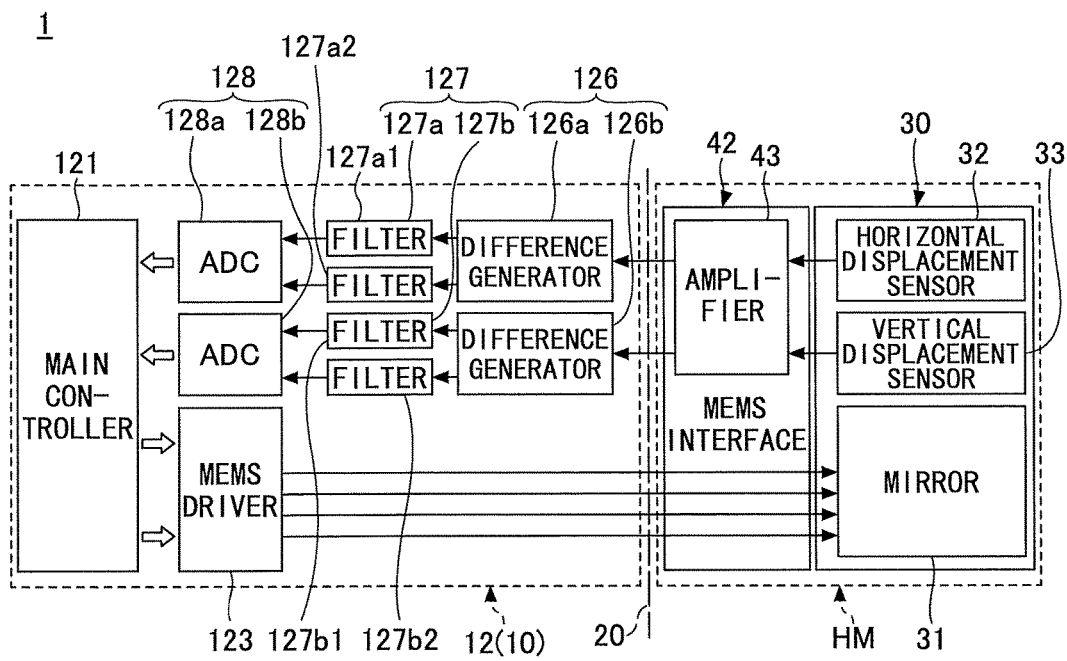
FIG. 3 is a diagram illustrating partial details of a head mount unit and an optical scanning controller, which are included in the retinal scanning head-mounted display according to the embodiment.

Next, by referring to FIG. 3, the feature of the retinal scanning projector 1 is described. FIG. 3 is a diagram illustrating partial details of the head mount unit HM and the optical scanning controller 10, which are included in the retinal scanning projector 1.

The head mount unit HM and the optical scanning controller 10 included in the retinal scanning projector 1 according to the embodiment feed back motion information corresponding to a tilt of the optical scanner 30 output from the MEMS interface 42 through the transmission cable 20.

More specifically, the optical scanner 30 included in the head mount unit HM according to the embodiment includes a mirror 31 for scanning a laser beam; a horizontal displacement sensor 32; and a vertical displacement sensor 33. The horizontal displacement sensor 32 detects a displacement of the mirror 31 in the horizontal direction. The vertical displacement sensor 33 detects a displacement of the mirror 31 in the vertical direction.

Further, the MEMS interface 42 included in the head mount unit HM includes an amplifier 43. The amplifier 43 amplifies a horizontal sensor signal output from the horizontal displacement sensor 32 and a vertical sensor signal output from the vertical displacement sensor 33. The horizontal sensor signal output from the horizontal displacement sensor 32 and the vertical sensor signal output form the vertical displacement sensor 33 are analog signals. The horizontal sensor signal and the vertical sensor signal immediately after the output are in high-impedance states such that noise is easily added. Accordingly, in the embodiment, the horizontal displacement sensor 32 and the vertical displacement sensor 33, and the amplifier 43 are placed at positions in close proximity to each other in the head mount unit HM. Consequently, the amplifier 43 can immediately stabilize the output sensor signals (to the low-impedance state). Furthermore, a buffer effect by the amplifier can be expected.

The amplifier outputs, by a single signal line, the stabilized (amplified) horizontal sensor signal to the optical scanning controller 10 through the transmission cable 20. Additionally, the amplifier 43 outputs, by a single signal line, the stabilized (amplified) vertical sensor signal to the optical scanning controller 10 through the transmission cable 20. Namely, two signal lines are required for transmitting respective sensor signals from the amplifier 43 to the optical scanning controller 10.

More specifically, the optical scanning controller 10 (the electronic circuit board 12) according to the embodiment includes a difference generator 126; a filter 127; and an analog-to-digital converter (which is simply referred to as ADC, hereinafter) 128.

The difference generator 126 receives, from the amplifier 43 of the head mount unit HM, respective sensor signals transmitted through the transmission cable 20.

The difference generator 126 includes a horizontal difference generator 126a and a vertical difference generator 126b. The horizontal difference generator 126a generates a horizontal difference signal from the horizontal sensor signal transmitted from the amplifier 43. There are two types of difference signals generated, which are positive and negative. The horizontal difference generator 126a outputs two types of horizontal difference signals to the filter 127 through a positive (+) signal line and a negative (−) signal line, respectively.

The vertical difference generator 126b generates a vertical difference signal from the vertical sensor signal transmitted from the amplifier 43. There are two types of difference signals generated, which are positive and negative. The vertical difference generator 126b outputs two types of vertical difference signals to the filter 127 through a positive (+) signal line and a negative (−) signal line, respectively.

The filter 127 removes noise from each difference signal output from the difference generator 126. The filter 127 includes a horizontal filter 127a and a vertical filter 127b. The horizontal filter 127a is provided with a first filter 127a1 for removing noise from the positive difference signal transmitted through the positive (+) signal line; and a second filter 127a2 for removing noise from the negative difference signal transmitted through the negative (−) signal line.

The first filter 127a1 and the second filter 127a2 respectively output, to the ADC 128, the horizontal difference signals from which the noise is removed.

The vertical filter 127*b* is provided with a third filter 127*b*1 for removing noise from the positive difference signal transmitted through the positive (+) signal line; and a fourth filter 127*b*2 for removing noise from the negative difference signal transmitted through the negative (−) signal line.

The third filter 127*b*1 and the fourth filter 127*b*2 respectively output, to the ADC 128, the vertical difference signals from which the noise is removed.

The ADC 128 converts each difference signal in the analog format output from the filter 127 into a digital signal, and the ADC 128 outputs the converted signal to the main controller 121.

The vertical ADC 128*b* converts the difference signals output from the third filter 127*b*1 and the fourth filter 127*b*2, from which the noise is removed, into a digital signal.

Note that, based on the motion information (difference signal) corresponding to the tilt of the optical scanner 30 (the mirror 31) obtained from the ADC 128, the main controller 121 outputs, to the MEMS driver 123, a drive control signal to control driving of the optical scanner 30 so as to properly control driving of the optical scanner 30.

Advantage

Figure 4:
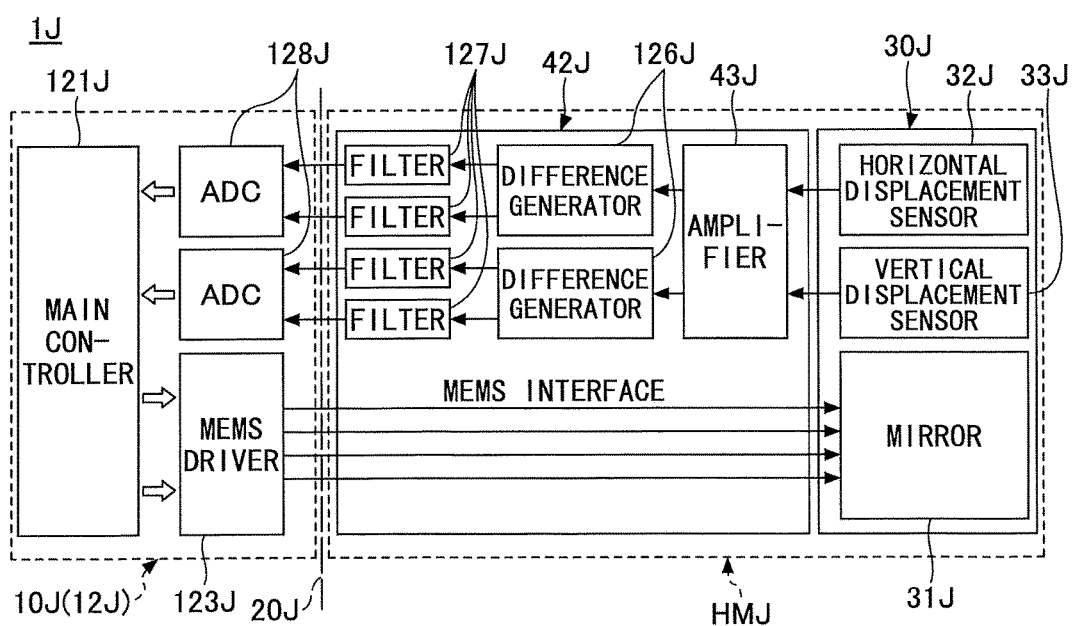
FIG. 4 is a diagram illustrating an advantage of the embodiment.

The advantage of the embodiment is described by referring to FIG. 4. FIG. 4 is a diagram illustrating the advantage of the embodiment. FIG. 4 is a diagram illustrating partial details of a head mount unit HMJ and an optical scanning controller 10J, which are included in a retinal scanning projector 1J according to a reference example. FIG. 4 corresponds to FIG. 3. It is assumed that the components of FIG. 3 and the components of FIG. 4 are configured to be approximately the same.

As depicted, the head mount unit HMJ according to the reference example and the head mount unit HM according to the embodiment illustrated in FIG. 3 are different in the components installed.

In the head mount unit HMJ according to the reference example illustrated in FIG. 4, a difference generator 126J and a filter 127J, which are installed in the optical scanning controller 10 (electronic circuit board 12) in the embodiment, are installed. Accordingly, an amplifier 43J, a difference generator 126J, and the filter 127J are to be installed in the MEMS interface 42J (substrate). As a result, a size of a circuit board of the MEMS interface 42J becomes large. Then, the size of the head mount unit HMJ itself, in which the enlarged MEMS interface J is installed, becomes large, so that wearability and usability for a user to wear it on a head become worse.

As described above, in the retinal scanning projector 1 according to the embodiment illustrated in FIG. 3, in particular, the components arranged in the MEMS interface 42 of the head mount unit HM is limited only to the amplifier 43, so that the size of the circuit board of the MEMS interface 42 can be reduced. As a result, reduction in the size of the head mount unit HM can be facilitated, and wearability and usability of the head mount unit HM can be enhanced. Furthermore, as the amplifier 43 stabilizes the horizontal sensor signal and the vertical sensor signal and then transmits them to the optical scanning controller 10, the signals can be transmitted and receive while minimizing the noise factors.

Further advantages of the retinal scanning projector 1 according to the embodiment are described. In the head mount unit HMJ according to the reference example illustrated in FIG. 4, the amplifier 43J, the difference generator 126J, and the filter 127J are arranged in the MEMS interface 42J. Further, the difference signals, from which the noise is removed, output from the filter 127J are transmitted to an optical scanning controller 10J through a transmission cable 20J.

As described above, there are four types of difference signals output from the filter 127J. Namely, as the horizontal difference signals, there are two types, which are the positive difference signal and the negative difference signal. Furthermore, as the vertical difference signals, there are two types, which are the positive difference signal and the negative difference signal. For all the four types of difference signals, corresponding four signal lines are required.

Namely, for the retinal scanning projector 1J according to the reference example, at least four signal lines are required, which are to be included in the transmission cable 20J and which are for transmitting the difference signals.

In the retinal scanning projector 1 according to the embodiment, however, the components arranged in the MEMS interface 42 of the head mount unit HM are limited only to the amplifier 43, as described above. As a result, it suffices if the signal lines, which are to be included in the transmission cable 20 and which are for transmitting the difference signals, are the two signal lines, which are the signal line for transmitting the horizontal sensor signal and the signal line for transmitting the vertical sensor signal.

For the above-described retinal scanning projector 1, weight reduction can be achieved and flexibility can be obtained by reducing the number of the signal lines, which are to be included in the transmission cable 20 and which are for transmitting the difference signals, by two from the number of the signal lines of the reference example and by reducing the diameter of the transmission cable 20.

Furthermore, in the retinal scanning projector 1 according to the embodiment, the transmission cable 20, which is to be coupled to the head mount unit HM, is rich in flexibility and lightweight. Accordingly, it is possible to minimize deterioration, due to the transmission cable 20, of wearability and usability for the user to wear the head mount unit HM. Furthermore, as the transmission cable 20 can be made smaller and lighter, the length of the transmission cable 20 can be extended. Consequently, the range of use can be enlarged.

The optical scanning head-mounted display and the retinal scanning head-mounted display are described above by embodiment. However, the optical scanning head-mounted display and the retinal scanning head-mounted display according to the present invention are not limited to the above-described embodiment, and various modifications and improvements may be made within the scope of the present invention.

The present application is based on and claims the benefit of priority of Japanese Priority Application No. 2016-188953, filed on Sep. 28, 2016, the entire contents of which are hereby incorporated herein by reference.

What is claimed is:

1. An optical scanning head-mounted display comprising:
    an optical scanning controller that emits, as image light, a laser beam in accordance with an image signal;
    a transmission cable that transmits the image light emitted from the optical scanning controller; and
    a head mount unit provided with an optical scanner including a mirror for scanning the image light transmitted by the transmission cable,
    wherein the head mount unit includes an amplifier that amplifies a motion signal corresponding to a tilt of the mirror, the motion signal being output from the optical scanner, and wherein the optical scanning controller includes a difference generator that generates a difference signal from the motion signal output from the amplifier through the transmission cable and a filter that removes noise from the difference signal generated by the difference generator.

2. The optical scanning head-mounted display according to claim 1, wherein the optical scanning controller includes a horizontal displacement sensor and a vertical displacement sensor,
wherein the horizontal displacement sensor detects a displacement of the mirror in a horizontal direction,
wherein the vertical displacement sensor detects a displacement of the mirror in a vertical direction, and
wherein the amplifier amplifies a horizontal sensor signal output from the horizontal displacement sensor and a vertical sensor signal output from the vertical displacement sensor as the motion signal.

3. The optical scanning head-mounted display according to claim 2, wherein the horizontal displacement sensor, the vertical displacement sensor, and the amplifier are placed at positions in close proximity to each other in the head mount unit.

4. A retinal scanning head-mounted display comprising:
an optical scanning controller that emits, as image light, a laser beam in accordance with an image signal;
a transmission cable that transmits the image light emitted from the optical scanning controller; and
a head mount unit provided with an optical scanner including a mirror for scanning the image light transmitted by the transmission cable so as to project the image light onto a retina of a user,
wherein the head mount unit includes an amplifier that amplifies a motion signal corresponding to a tilt of the mirror, the motion signal being output from the optical scanner, and
wherein the optical scanning controller includes a difference generator that generates a difference signal from the motion signal output from the amplifier through the transmission cable and a filter that removes noise from the difference signal generated by the difference generator.

5. The retinal scanning head-mounted display according to claim 4, wherein the optical scanning controller includes a horizontal displacement sensor and a vertical displacement sensor,
wherein the horizontal displacement sensor detects a displacement of the mirror in a horizontal direction,
wherein the vertical displacement sensor detects a displacement of the mirror in a vertical direction, and
wherein the amplifier amplifies a horizontal sensor signal output from the horizontal displacement sensor and a vertical sensor signal output from the vertical displacement sensor as the motion signal.

6. The retinal scanning head-mounted display according to claim 5, wherein the horizontal displacement sensor, the vertical displacement sensor, and the amplifier are placed at positions in close proximity to each other in the head mount unit.

* * * * *